US008920229B1

(12) United States Patent
Chun

(10) Patent No.: US 8,920,229 B1
(45) Date of Patent: Dec. 30, 2014

(54) SECURED GAMING CARDS AND VERIFICATION SYSTEM

(71) Applicant: Novel Tech International Limited, Hong Kong (HK)

(72) Inventor: Jay Chun, Hong Kong (HK)

(73) Assignee: Novel Tech International Limited, Hong Kong (CN)

( * ) Notice: Subject to any disclaimer, the term of this patent is extended or adjusted under 35 U.S.C. 154(b) by 0 days.

(21) Appl. No.: 14/095,882

(22) Filed: Dec. 3, 2013

(51) Int. Cl.
*A63F 13/00* (2014.01)
*G07F 17/32* (2006.01)

(52) U.S. Cl.
CPC .................................. *G07F 17/3293* (2013.01)
USPC ...... 463/16; 273/149 P; 273/149 R; 273/309; 463/42; 463/43

(58) Field of Classification Search
CPC ..... A63F 13/10; G07F 17/32; G07F 17/3225; G07F 17/3234; G07F 17/3241; G07F 17/3251
USPC .......... 273/149 P, 149 R, 309; 463/16, 42, 43
See application file for complete search history.

(56) References Cited

U.S. PATENT DOCUMENTS 5,083,271 A 1/1992 Thacher et al.
5,347,061 A * 9/1994 Harandi et al. ............... 585/323
5,472,194 A 12/1995 Breeding et al.
5,605,334 A * 2/1997 McCrea, Jr. .................. 273/309
5,768,382 A 6/1998 Schneier et al.
5,851,011 A 12/1998 Lott
5,917,725 A 6/1999 Thacher et al.
5,970,143 A 10/1999 Schneier et al.
6,165,069 A 12/2000 Sines et al.
6,331,148 B1 12/2001 Krause
6,671,358 B1 12/2003 Seidman et al.
6,886,829 B2 * 5/2005 Hessing et al. ........... 273/149 R
7,008,322 B1 3/2006 Suzuki et al.
7,040,982 B1 5/2006 Jarvis
7,206,762 B2 4/2007 Sireau
7,233,922 B2 6/2007 Asher
7,566,268 B2 7/2009 Asher
7,566,270 B2 7/2009 Amaitis
7,604,537 B2 10/2009 Amaitis
7,684,874 B2 3/2010 Schlottmann et al.

(Continued)

OTHER PUBLICATIONS

Office Action for U.S. Appl. No. 13/948,101, mailed Dec. 16, 2013.

(Continued)

*Primary Examiner* — James S McClellan

(57) ABSTRACT

A gaming card verification system includes electronic gaming tables and a system server in communication with and located remotely from the tables. The system or table tracks playing cards at each table and facilitates alerts when improper conditions are detected. Gaming tables can include a physical surface for playing card games, an automated shoe or card handler, a smart discard rack, and a table controller. First sensors detect a first identifier on each card and separate second sensors detect a separate second identifier on the card. The first identifier can be a randomly assigned code unique to each card, while the second identifier indicates a game value of the card. A database can store and provide details regarding card identifiers, values and locations. The discard rack can detect discards and reconcile those with what issued from the shoe. Both counterfeit card insertions and missing cards can be detected thereby.

25 Claims, 6 Drawing Sheets

(56) References Cited

U.S. PATENT DOCUMENTS

| | | | |
|---|---|---|---|
| 7,690,996 | B2 | 4/2010 | Iddings et al. |
| 7,711,628 | B2 | 5/2010 | Davie |
| 7,783,542 | B2 | 8/2010 | Horowitz |
| 7,783,552 | B2 | 8/2010 | Assia |
| 7,798,895 | B2 | 9/2010 | Jubinville et al. |
| 8,070,583 | B2 | 12/2011 | Baerlocher et al. |
| 8,150,157 | B2 * | 4/2012 | Downs et al. ................. 382/181 |
| 8,262,090 | B2 * | 9/2012 | Soltys et al. ............... 273/149 P |
| 8,282,489 | B2 | 10/2012 | Arezina et al. |
| 8,469,788 | B2 | 6/2013 | Carpenter et al. |
| 2002/0147042 | A1 | 10/2002 | Shinners et al. |
| 2002/0151366 | A1 | 10/2002 | Walker et al. |
| 2003/0137110 | A1 | 7/2003 | Huard et al. |
| 2003/0195841 | A1 | 10/2003 | Ginsberg |
| 2004/0204232 | A1 | 10/2004 | Asher |
| 2005/0043094 | A1 | 2/2005 | Nguyen et al. |
| 2005/0165669 | A1 | 7/2005 | Montanaro |
| 2005/0197938 | A1 | 9/2005 | Davie |
| 2005/0197948 | A1 | 9/2005 | Davie |
| 2006/0058082 | A1 | 3/2006 | Crawford et al. |
| 2006/0058083 | A1 | 3/2006 | Crawford et al. |
| 2006/0058084 | A1 | 3/2006 | Crawford et al. |
| 2006/0058085 | A1 | 3/2006 | White et al. |
| 2006/0058086 | A1 | 3/2006 | White et al. |
| 2006/0058087 | A1 | 3/2006 | White et al. |
| 2006/0058088 | A1 | 3/2006 | Crawford et al. |
| 2006/0058089 | A1 | 3/2006 | White et al. |
| 2006/0058090 | A1 | 3/2006 | Crawford et al. |
| 2006/0058091 | A1 | 3/2006 | Crawford et al. |
| 2006/0058092 | A1 | 3/2006 | Crawford et al. |
| 2006/0058093 | A1 | 3/2006 | White et al. |
| 2006/0066052 | A1 | 3/2006 | White et al. |
| 2006/0068498 | A1 | 3/2006 | White et al. |
| 2006/0068864 | A1 | 3/2006 | White et al. |
| 2006/0068865 | A1 | 3/2006 | White et al. |
| 2006/0068866 | A1 | 3/2006 | White et al. |
| 2006/0068868 | A1 | 3/2006 | Crawford et al. |
| 2006/0068869 | A1 | 3/2006 | White et al. |
| 2006/0068870 | A1 | 3/2006 | Crawford et al. |
| 2006/0068871 | A1 | 3/2006 | Crawford et al. |
| 2006/0068879 | A1 | 3/2006 | Crawford et al. |
| 2006/0068899 | A1 | 3/2006 | White et al. |
| 2006/0100019 | A1 | 5/2006 | Hornik et al. |
| 2006/0105839 | A1 | 5/2006 | Graeve |
| 2006/0264252 | A1 | 11/2006 | White et al. |
| 2006/0287066 | A1 | 12/2006 | Crawford et al. |
| 2006/0287067 | A1 | 12/2006 | White et al. |
| 2006/0287101 | A1 | 12/2006 | Crawford et al. |
| 2006/0287102 | A1 | 12/2006 | White et al. |
| 2006/0287103 | A1 | 12/2006 | Crawford et al. |
| 2006/0287104 | A1 | 12/2006 | White et al. |
| 2007/0129138 | A1 | 6/2007 | Amaitis |
| 2007/0259709 | A1 | 11/2007 | Kelly et al. |
| 2008/0045344 | A1 | 2/2008 | Schlottmann et al. |
| 2008/0081685 | A1 | 4/2008 | Naftaly |
| 2008/0108404 | A1 | 5/2008 | Iddings et al. |
| 2008/0113767 | A1 | 5/2008 | Nguyen et al. |
| 2008/0200242 | A1 | 8/2008 | Ginsberg |
| 2008/0248849 | A1 | 10/2008 | Lutnick et al. |
| 2009/0124323 | A1 * | 5/2009 | Dunn et al. ..................... 463/17 |
| 2009/0131151 | A1 | 5/2009 | Harris et al. |
| 2009/0280904 | A1 | 11/2009 | Nicely et al. |
| 2011/0294561 | A1 | 12/2011 | Shaw et al. |
| 2012/0083909 | A1 | 4/2012 | Carpenter et al. |
| 2012/0329551 | A1 | 12/2012 | Arezina et al. |
| 2013/0116031 | A1 | 5/2013 | Carpenter et al. |
| 2013/0225276 | A1 | 8/2013 | Au-Yeung |
| 2013/0244765 | A1 | 9/2013 | Arnone et al. |
| 2013/0281197 | A1 | 10/2013 | Carpenter et al. |
| 2013/0288764 | A1 | 10/2013 | Chun |
| 2013/0288779 | A1 | 10/2013 | Chun |
| 2013/0296031 | A1 | 11/2013 | Arnone et al. |

OTHER PUBLICATIONS

Cantor Fitzgerald Hopes to Bring Spread Betting to Las Vegas Casinos, Dec. 14, 2009.
Financial Spread Betting, Apr. 26, 2012.
High-Speed Traders Set Their Sights on Asia and Latin America, Aug. 12, 2010.
Office Action for U.S. Appl. No. 13/456,110, mailed Jun. 11, 2013.
Final Office Action for U.S. Appl. No. 13/456,110, mailed Dec. 24, 2013.
Office Action for U.S. Appl. No. 14/017,071, mailed Nov. 7, 2013.
Notice of Allowance for U.S. Appl. No. 14/017,071, mailed Jan. 24, 2014.
Office Action for U.S. Appl. No. 14/017,073, mailed Dec. 10, 2013.
Final Office Action for U.S. Appl. No. 13/948,101, mailed Apr. 23, 2014.

* cited by examiner

SECURED GAMING CARDS AND VERIFICATION SYSTEM

TECHNICAL FIELD

The present invention relates generally to gaming machines, tables and systems, and more particularly to gaming tables having automated components.

BACKGROUND

Wagering games such as baccarat, blackjack, roulette, craps, sic-bo, and various poker-based table games, among many others, are popular games offered in casinos and other similar establishments. These games are generally administered by human dealers and are played on physical gaming tables having a dealer surface, felt or similar table top layouts, cards, dice, chips and the like. Alternatively, such table games can be played on electronic gaming machines where the dealer, playing cards, chips or other gaming elements may be virtual.

It is generally well known that casinos and other gaming operators that provide or host table games need to be on alert for cheating or other unscrupulous behavior on the part of some gaming players. Certain types of players can tend to look for any kind of advantage, whether legal or illegal. As such, it can be important that gaming operators be on the lookout for fraudulent or shady activities, such as bet switching, chip stealing, card marking or counterfeiting, improper information sharing between players, and other things that can cost the operator money and discourage participation for honest players.

As a particular example, players may try to introduce counterfeit or additional playing cards into the deck or card shoe at a gaming table where playing cards are used. Alternatively, players may try to remove cards from the table or otherwise manipulate cards, dice, chips, tokens or other physical items in order to obtain an illegal or improper advantage during continued game play. For example, players may wish to add extra aces into the game and/or remove 5s or other undesirable cards from the game at a blackjack table. Even where a player is able to insert or remove one or two cards from a gaming table, a real advantage or edge can be obtained with respect to the overall game odds that are changed thereby. Other examples for adding or removing playing cards or other gaming elements will become readily apparent upon further consideration.

In any such events, it is incumbent upon the table dealer and other casino or operator personnel to watch out for such illicit activities. While overhead cameras, other surveillance equipment, and ordinary vigilance on the part of a gaming operator and its employees can be helpful, gaming cheats may still look for opportunities depending upon a given situation. As such, there have been attempts at adding even more security features to the casino floor. In addition, there is always the possibility of dealer error, which errors can tend to cost the casino or other gaming establishment, since players will tend only to call out dealer errors that are in favor of the casino while taking advantage of errors in their favor. Further automation beyond manual observation and vigilance may be helpful in some circumstances.

While gaming tables and systems therefor have worked well in practice over many years, there is always a desire improve the functionality, efficiency and security of gaming tables, physical gaming components thereon, and any features that support them. What is desired then are improved gaming tables and components therefor, particularly with respect to the ability to track and verify physical gaming elements, such as playing cards.

SUMMARY

It is an advantage of the present disclosure to provide gaming table systems, particularly with respect to those having physical gaming components such as cards, dice, balls, chips, tokens, and the like. This can be accomplished at least in part through the use of electronic tracking components and systems that are adapted to utilize specialized identifiers on playing cards or other relevant gaming elements, among other various features and options.

In various embodiments of the present disclosure, an electronic gaming table can be adapted to host table games involving wagers, table games based on the wagers, and monetary awards based on the results of the table games. The electronic gaming table can include a physical surface adapted for the play of live table games that include the use of a plurality of playing cards and/or other physical gaming elements, an automated card handling device adapted to handle and detect the plurality of playing cards, and a table controller. The automated card handling device can have a first sensor adapted to sense a first identifier on a playing card and a separate second sensor adapted to sense a separate second identifier on the same playing card. The first identifier can indicate whether the playing card belongs at the electronic gaming table, and the separate second identifier can indicate a game value of the playing card. The table controller can be coupled to the automated shoe or card handling device, and can be adapted to control a plurality of electronic gaming table functions, such as to facilitate the provision of an alert when an improper first identifier on a playing card is detected.

In various detailed embodiments, the table controller is further adapted to utilize the detected game value of a second identifier while controlling one of the plurality of electronic gaming table functions. In some embodiments, the first identifier includes an identification code and the second identifier includes the suit of the playing card, the rank of the playing card, or both. The first identifier can indicate whether the playing card belongs to a deck of playing cards or shoe that is known to belong at the electronic gaming table. In fact, the automated card handling device can be an electronic card shoe. One or both of the first and second identifiers can include a bar code, and/or can be written in invisible ink, UV ink, or some other low visibility type of marking. The first identifier can be unique to its respective playing card, such that each card has a unique identifier. These first identifiers can be randomly generated and assigned, and can be in the form of a number, alphanumeric string, or other type of code. In some embodiments, the table controller can be adapted to facilitate a comparison of the results detected by the first and second sensors.

In various detailed embodiments, the gaming table can further include an automated collection component that is in communication with the table controller and adapted to contain playing cards that are discarded or used during or after the live table games. Such an automated collection component can be a "smart" discard rack, and can include a third sensor and also a fourth sensor, either or both of which are adapted to sense the first identifier, the second identifier, or both. In some embodiments, the table controller is further adapted to facilitate the reconciliation of playing card detection by the automated card handling device with playing card detection by the discard rack or other automated collection component. In some embodiments, the electronic gaming table can also include a communications interface adapted to couple the table controller with one or more external system components. Such external system components may include additional electronic gaming tables, a remote server, a database or other storage including playing card information, or any combination thereof. In such embodiments, the table controller can be further adapted to communicate with the external system components in order to facilitate the reconciliation of playing card detection by an overall system that includes the electronic gaming table.

In various further embodiments, a gaming card verification system can include one or more electronic gaming tables such as those set forth above, as well as a system server in communication with and located remotely from said one or more electronic gaming tables. The system server can be adapted to track the presence and location of playing cards at each of the one or more electronic gaming tables and facilitate the provision of an alert when an improper condition with respect to any playing card at any table is detected. As in the foregoing embodiments, a first identifier on a playing card or other physical gaming element can be a randomly generated and assigned number or code that is unique to its respective playing card or other gaming element. In addition, the gaming card verification system can include a database or other storage component in communication with the system server. This storage component can contain information regarding a plurality of playing cards located at the one or more electronic gaming tables in the system. Further, the system server can be adapted to provide information from the storage component to an individual table controller at one of the gaming tables, wherein the information provided is with respect to playing cards that should be at the gaming table, and wherein the table controller is adapted to track cards locally at the table using the provided information without requiring further communication with the server.

In still further embodiments, various methods of tracking playing cards within a gaming system are provided. Pertinent process steps can include providing a first identifier on each of a plurality of playing cards, wherein each first identifier is unique with respect to every other first identifier, using a separate second identifier on each of the plurality of playing cards, wherein the separate second identifier indicates a game value of the playing card, storing information regarding each of said plurality of playing cards on a system storage component, wherein the stored information includes at least the first identifier and the second identifier for each playing card, indicating when a batch of playing cards is provided at a gaming table within the gaming system, wherein the batch of playing cards is all or a subset of the overall plurality of playing cards, communicating information regarding the batch of playing cards from the system storage component to a table controller at the gaming table where the batch of playing cards is located, detecting automatically the first identifier and second identifier of one or more playing cards used for a table game at the gaming table, comparing the detected identifiers with the information communicated to the table controller, and giving an alert when a detected identifier is not verifiable with the information communicated to the table controller.

Various detailed embodiments of such methods can involve the system storage component being located remotely from the gaming table, as well as where providing the first identifier includes generating a random code as part or all of each first identifier. Also, the stored information for each playing card can further include an identifier for a playing card deck or electronic card shoe to which the playing card belongs. Additional process steps can include placing one or more used playing cards into an automated collection component at the gaming table, re-detecting automatically at the automated collection component the first identifier and second identifier of the one or more used playing cards, and giving an alert for an improper condition. Such an improper condition can occur when a detected identifier is not one that was already detected automatically for game play, or when an identifier detected for game play is not detected at the automated collection component within a defined time period, among other possibilities.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed inventive apparatuses, systems and methods for secured physical gaming elements and a verification system therefor. These drawings in no way limit any changes in form and detail that may be made to the disclosure by one skilled in the art without departing from the spirit and scope of the disclosure.

DETAILED DESCRIPTION

Figure 1A:
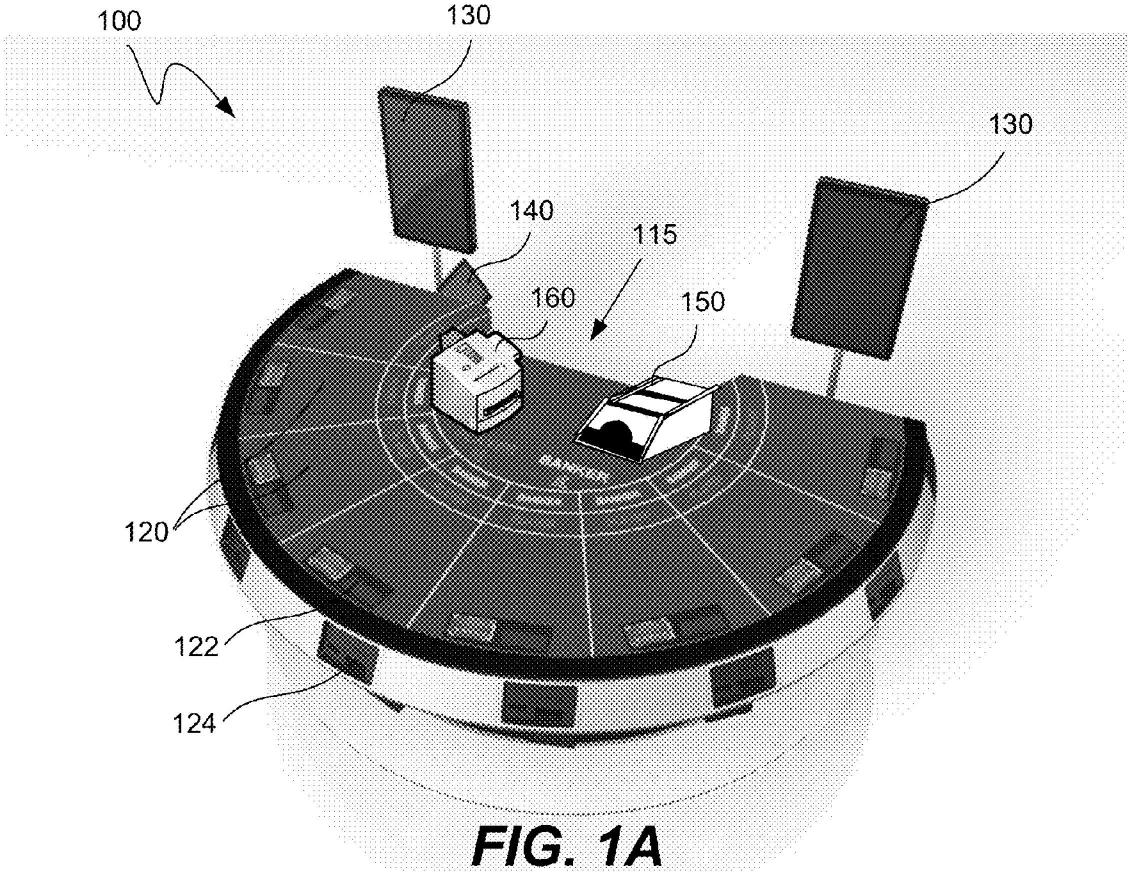
FIGS. 1A and 1B illustrate in top and front perspective views an exemplary electronic gaming table adapted for the play of table games while utilizing a physical gaming element verification system according to one embodiment of the present disclosure.

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to devices, systems and methods for providing, conducting and facilitating the play of wagering games at live electronic gaming tables that can include live dealers, live players, physical gaming components or items, and an electronic platform. As such, this disclosure may be applied to any live table game, such as baccarat, blackjack, roulette, craps, pai gow, sic bo, poker, bingo, keno, card games, and the like, as well as any other type of game having a live or electronic dealer, and/or one or more players seated at a gaming table or electronic gaming platform. In some embodiments, there may be no players actually seated at the physical gaming table itself, such that all players are playing at gaming terminals that are located apart from or even remotely from the actual physical surface of the gaming table. The various embodiments disclosed herein can be applied with respect to individual gaming tables, entire systems involving multiple tables, and methods of running table games and tracking game items on tables.

The present disclosure contemplates having a secure, closed loop control and verification system with respect to physical gaming items located at a gaming table or system of gaming tables. Such physical gaming items can be playing cards, for example. As such, the gaming table can have one or more components that are adapted to read and verify each card automatically before and/or when the card is being delivered for game play. Furthermore, reading and verifying of each card can also take place when the card is discarded into the discard rack or other finished location. Further system components can include a remote server and/or database or other storage component that are in communication with the various gaming tables. In addition, the disclosed electronic gaming tables and systems can be associated with one or more remote player terminals or other similar components. The respective gaming system or network can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art.

With respect to the playing cards disclosed, each card can have a plurality of codes or other markings thereon. At least one of the codes or markings can be unique to each given playing card, and this information can be stored electronically so as to more readily facilitate tracking and verification of all of the playing cards. Such unique codes or markings can be randomly assigned, and/or can be associated with a particular card deck, card shoe, gaming table, and/or other system components. In various embodiments, other markings or codes on the cards can also be detected, such that more reliable detection, tracking and association can take place. In this manner, it can be significantly more difficult for an unscrupulous player or party to insert, withdraw, or counterfeit an improper playing card into play at a system gaming table.

Although the present disclosure provides the example of playing cards for purposes of illustration, it will be readily appreciated that other physical gaming components or elements may be similarly used. Alternatively, or in addition to playing cards, other physical gaming elements can include, for example, dice, wheels, reels, balls, chips, tokens and the like. Such other physical gaming components can be marked, tracked and verified in a manner similar to that which is disclosed herein with respect to playing cards, as will be readily appreciated.

In general, the present disclosure can pertain to one electronic gaming table, a system of electronic gaming tables, a plurality of physical gaming elements or items, and various methods using such tables or components that allow for improved game element verification, tracking and security. A relevant electronic gaming table system can include multiple live electronic gaming tables ("eTables") and also a remote server adapted to store, communicate and verify information regarding the marked playing cards or other gaming elements at the various system tables. Other system components can include, for example, remote game terminals (electronic gaming machine ("EGM"), smart phone, smart TV, tablet, desktop computer, etc.), a central games repository and server that tracks live games from each eTable, a multi-site games traffic server, a financial server that acts as a Central Clearinghouse for remote wagers, and/or a network that connects the electronic gaming tables and various other system items.

A table processor and/or remote server can be used to administer the game, track player decisions, decide game outcomes, and/or facilitate the detection, verification and tracking of playing cards or other gaming elements at the tables. Other components and items may also be present as desired. Further details and other aspects with respect to the disclosed gaming table systems and remote gaming in general can be found at, for example, U.S. Pat. Nos. 7,914,368; 7,918,723; 7,922,587; 8,182,321; 8,210,920; 8,308,559; and 8,323,105, as well as U.S. patent application Ser. Nos. 14/017,073; 14/017,071; 13/948,101; 13/893,340; 13/844,617; 13/542,446; 13/456,110; 13/042,633; and Ser. No. 11/198,218, with the entire contents of all of these patents and applications being incorporated herein by reference in their entireties and for all purposes.

Regarding the present disclosure, the various gaming tables, systems, components, and gaming elements can be used for detecting, verifying and tracking playing cards and other physical gaming elements more securely. In particular, a given gaming table can include a "smart shoe" or other card or gaming element handling device having one or more sensors. Each provided sensor can detect a different piece of data. For example, a first sensor can detect a unique ID code on the card or other gaming element, while a separate second sensor can detect other information regarding the card or other gaming element. For example, such other information can include the suit and/or rank of the card, or alternatively the game value of the gaming element. The unique ID code can be used by the system to determine whether that playing card or other gaming element actually belongs at that gaming table, while the other information can be used to help verify the unique ID code. Alternatively, or in addition, the other information might also be used to help administer game play, such as where the value of the gaming element is used.

Figure 1B:
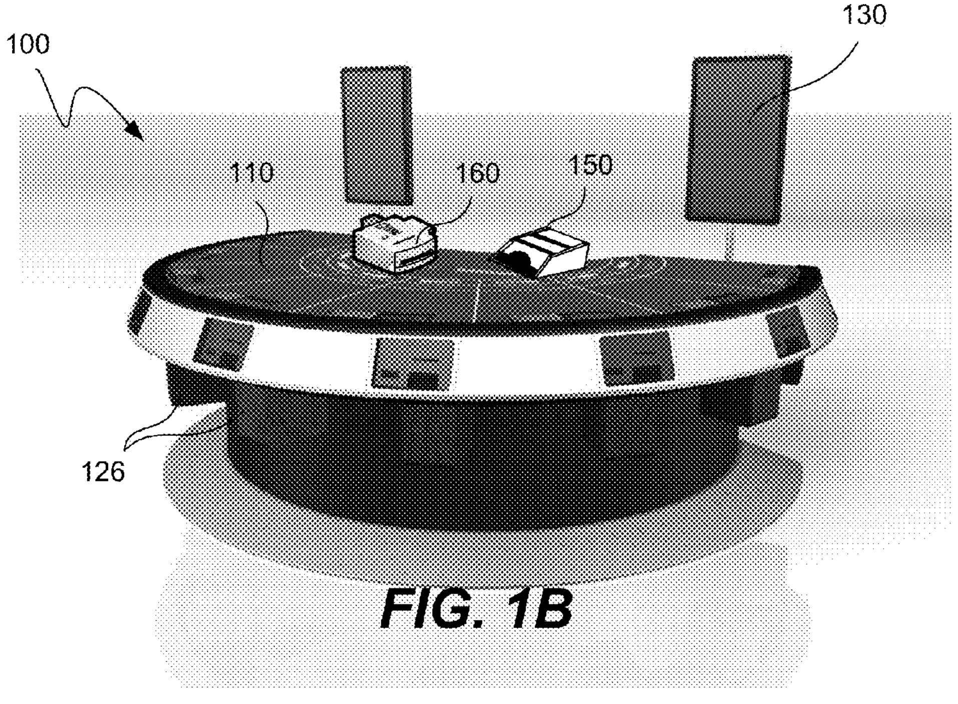

Referring first to FIGS. 1A and 1B, an exemplary electronic gaming table adapted for the play of table games while utilizing a physical gaming element verification system according to one embodiment of the present disclosure is illustrated in top and front perspective views respectively. It will be readily appreciated that this electronic gaming table ("eTable") 100 can also be provided in numerous other configurations and formats, such that the provided example is for illustrative purposes only. The eTable 100 can include a playing surface 110 adapted for the play of live table games using live physical components, a live dealer station or region 115, a plurality of optional player stations 120, each of which may have its own displays 122, bill acceptor, card acceptor and other input components 124, one or more community displays 130, and a dealer station display and/or computing device 140. One or more physical separators 126 may separate the different player stations 120. In some embodiments, eTable 100 might have no player stations, such that a dealer merely administers a live game at a table with no players, whereby all player action occurs at remote gaming terminals.

Each optional player position 120 around the eTable 100 can have a player terminal integrated into it. Each player terminal can have its own controller, buttons, touchscreen display, bill validator, printer, card reader, and so forth. The player terminals can be connected to a table controller ("TC") for the entire table via a switch/hub, and the TC connects to an overall local or wide area network, as provided in greater detail below. Each eTable 100 can be hosted by a live human dealer, such as at a dealer station 115. The live human dealer can deal real cards and/or use real dice or other physical game components, which can be done on a wooden green-felt table surface 110, for example. Other materials and/or colors may also be used. The TC, such as via player login data (such as player tracking card swipe or a cash insertion at the bill acceptor), knows which positions at the table are active and thus can monitor the progress of a game in some embodiments.

The eTable 100 can also have one or more displays. In one embodiment, there can be one or more community displays 130 to show common player information, such as community cards, table wager minimum, casino name, time, advertisement, and the like. Game history (e.g., baccarat roadmaps) may also be displayed on the same screen 130 or on a separate screen attached to or near the eTable 100. The eTable may also have discrete displays such as On/Off/Flashing lights mounted underneath table graphics to annunciate game information such as Banker Win, Player Win, New Game, No More Bets, and so forth. Such table screens and discrete displays can be driven by the TC.

Playing cards can be drawn from an automated card handling device, such as an electronic shoe ("eShoe") 150, which can be connected to the TC on the local table network. In some embodiments, the eShoe 150 or other handling device can scan or otherwise sense, read, or detect the cards, such as to note the rank and suits for each card removed. One or more table sensors, such as a camera, RFID reader, or the like, can be used to capture video of the dealer action for broadcasting, as well as tracking of players and physical game components through a variety of means. The camera can also be used to further verify and keep a log of game activities, such as, for example, cards removed from the eShoe, cards dealt to player positions, bets entered, new players, and the like.

In various embodiments, a "smart" discard rack 160 or other automated collection component can be used to collect or store cards after the cards are used for game play at the table. The discard rack 160 can also be adapted to scan, sense or otherwise detect cards that are placed therein. The discard rack 160 can also be connected to the TC on the local table network, such that the TC or some other system component can be made aware of card readings or detections at both the eShoe 150 and the discard rack 160. Further action can then be taken as appropriate to compare and analyze results at both devices, with alerts being provided in the event that anything problematic is detected. Further features regarding sensors and other items for eShoe 150 and discard rack 160 are provided in greater detail below.

Figure 2:
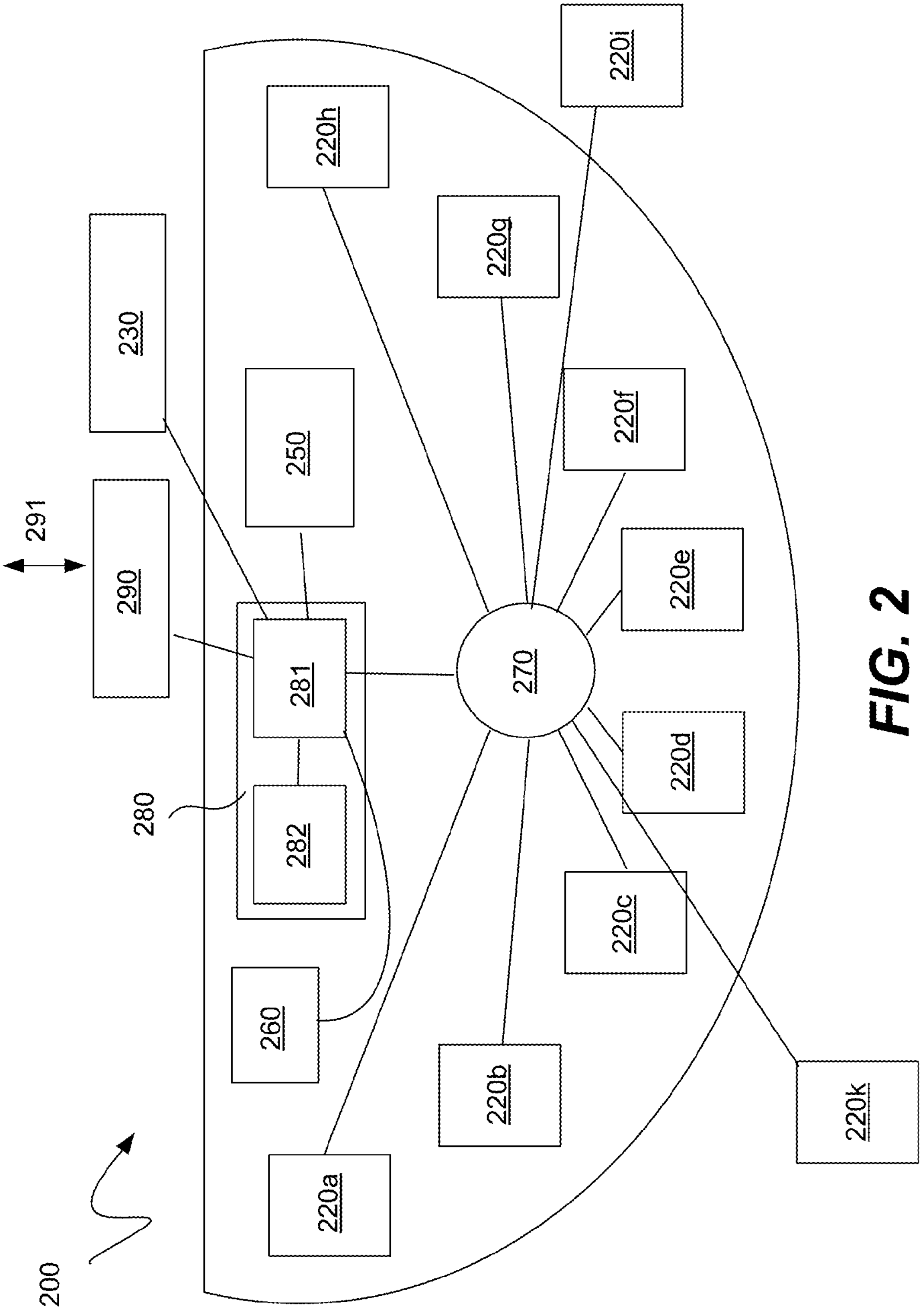
FIG. 2 illustrates in block diagram format an exemplary computing system for an electronic gaming table adapted for the play of table games while utilizing a physical gaming element verification system according to one embodiment of the present disclosure.

Continuing with FIG. 2, an exemplary computing system for an electronic gaming table adapted for the play of table games while utilizing a physical gaming element verification system is provided in block diagram format. Computing system 200 for an eTable can include various individual processors and peripherals 220*a*-220*k* for a plurality of player terminals or stations. In various embodiments, each of these separate items can be an identical or substantially similar set of processors, displays, inputs and other components, as may be desirable for each separate player station. As shown, some of the player stations (e.g., 220*a* through 220*h*) may be physically present at the eTable, while other player stations or terminals (e.g., 220*i* and 220*k*) may be located away from the eTable, as may be desired. Such remotely located player stations or terminals can be nearby the table and within view of the playing surface and or an overhead display of the playing surface, or may be located in a different room or different location entirely, such as where a video feed of the live table game can be provided to the player station for live play. Such remotely located player terminals can be implemented on a third party user device, such as a smart phone, tablet, laptop, PDA, smart glasses, or the like.

All of the player station systems 220*a*-220*k* can couple to a central router or hub 270, which can be coupled to a master table controller ("TC") 280 having a CPU 281 and memory or storage 282. The TC can be coupled to one or more table displays 230, as well as an interface 290 for outside communications. Such table display(s) 230 can provide views of the playing surface to many more players that may be nearby the table but not in position to have a good view of the playing surface. In this manner, dozens or hundreds of players can be playing at a single table. Link 291 represents the connection to the network, so that system 200 is able to communicate with various other outside network or system components.

In various embodiments, a remote game server can administer some or all of the game away from the actual physical table. The remote server can have the rules of the game, and can be responsible to conduct the table game, such that the TC 280 only conducts data acquisition. As such, the TC 280 can be connected to the card shoe, discard rack, shuffler, camera (s), dealer terminal, chip counter, overhead display(s), and so forth. In operation, the TC 280 can collect raw data from these peripherals and then provide this data to the host game server located remotely. The remote host or game server can then provide any number of functions, such as, for example, to validate and track playing cards, process the game according to game rules, store the game states, keep track of game history, resolve player hands, credit or debit player accounts, run the community display, and the like. Data from each player terminal can be collected by the table controller or processor (i.e., TC) and forwarded to the remote server, can be sent to the remote server directly from player terminals, or some combination thereof.

In embodiments involving a remote game server, such a game server of the system may be adapted to handle multiple tables simultaneously. In such embodiments, the system can also broadcast games or action at multiple tables to each remote player terminal, thus allowing the player to watch other games and/or participate in more than one game at the same time. The system can also track playing cards or other physical game elements across multiple tables over a wide area network, whereby cards can be moved from table to table and still be tracked.

In other embodiments, the TC itself can perform all of these functions during game play. In such embodiments, the eTable can be an isolated stand alone device, such as a single gaming machine or component. In some such arrangements, only start and end playing card tracking and/or final accounting results can then be forwarded to an overall casino or gaming system or other gaming network, as may be desired. For example, the remote system can be adapted only to note where playing cards should be, while the TC can locally track and provide alerts or error messages with respect to actual cards or other gaming elements at its respective table.

In various embodiments involving a remote server, a TC that runs most or all of the game functions, or both, the effective game controller can calculate the game results and then send such results to the live dealer for the final game decision. That is, the live dealer can be the final arbiter of the game results as provided by the appropriate game controller or processor. This redundant decision maker can assure a more robust game, as the dealer can correct game errors and make other actions before broadcasting any final game and payout results or resolutions.

In various embodiments, there may or may not be live players at the eTable. That is, in some embodiments the eTable may not have any live players sitting at the table, and rather has only the dealer, playing surface, cards and/or other live physical game components. In such embodiments, all live players may wager on and participate in the game action through remotely located game terminals. Again, such remotely located terminals may be nearby the eTable and within view of the playing surface and/or one or more community displays. For example, such nearby player terminals can be within 100 feet of the eTable. Of course, further distances and/or removed locations to other rooms or properties are also possible, such as where the remotely located players can view a video of the live game action.

Figure 3:
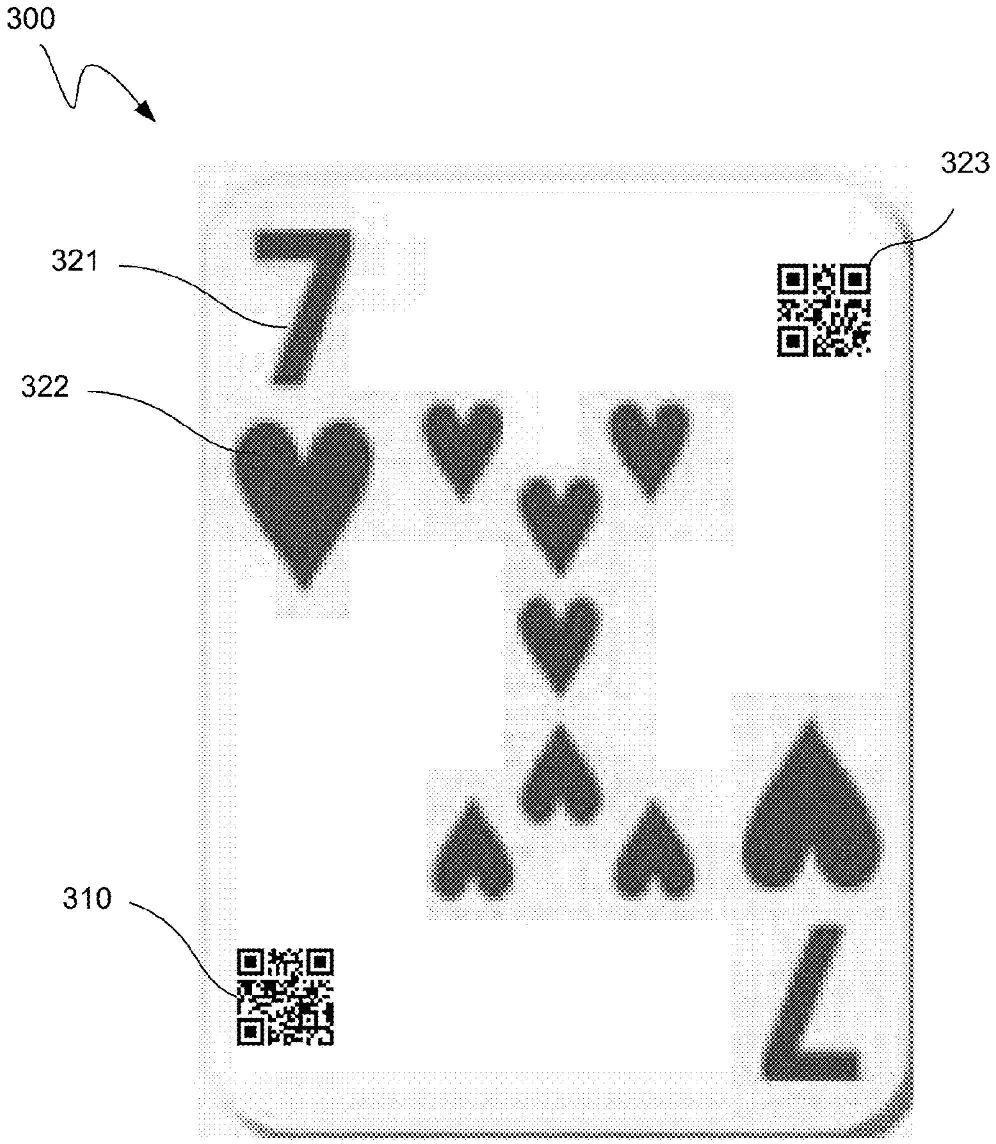
FIG. 3 illustrates the front face of an exemplary playing card having various indicia thereon for use in a gaming card verification system according to one embodiment of the present disclosure.

Moving next to FIG. 3, the front face of an exemplary playing card having various indicia thereon for use in a gaming card verification system is illustrated. Playing card 300 can be a standard playing card from a 52-card deck, although it will be readily appreciated that multiple decks can be used at the same time for many table games involving playing cards. For example, the eShoe on gaming table 100 can be adapted to hold 6, 8, or 12 decks at a time, as well as any other number of decks or cards. As shown, playing card 300 is a seven of hearts, although it will be readily appreciated that any other rank and suit of playing card can have similar features as disclosed herein.

As shown, card 300 can have various indicia thereon. For example, a first identifier 310 can be located along an edge of the card, and can take any of a variety of different forms. As shown, identifier 310 can be a two dimensional QR code, which can contain specific information that is unique to card 300. For example, QR code 310 can read "unique playing card identifier" or some other code. Other forms of codes or identifiers could alternatively be used, such as, for example, bar codes, simple alphanumeric strings, embedded RFID tags, and the like. In some embodiments, identifier 310 can be plainly visible to players and other persons, while in others the identifier can be printed in invisible ink, IR ink, UV ink, magnetic ink, or capacitive ink, for example. In various embodiments, card 300 can be printed on special paper or other materials, such that the card appears ordinary and not cluttered to players and other users. Unique paper or materials that allow for special detection such as via capacitance, reflectivity, transparency, conductivity or the like can be used to facilitate card detection and tracking without distracting from game play.

Regardless of the form of code used, identifier 310 can contain a code or information that is unique to the card 300. In fact, every different card within each deck and throughout the subject gaming and card tracking and verification system can have an identifier 310 that is original and different with respect to every other card. In various embodiments, all or at least a portion of this unique identifier 310 can be randomly generated. Such a randomized and assigned code can make it more difficult or impossible for unscrupulous persons to attempt to forge or counterfeit playing cards and introduce such cards into play at a system gaming table. In some embodiments, the randomly generated and assigned first identifier 310 can be determined and created at the time that it is printed to or otherwise affixed or assigned to the card 300, such as during card manufacture.

The identifier 310 for each playing card 300 in the overall system can be noted and stored on a system database or other storage component for future reference and card verification. Accordingly, the database entry for each card 300 can include its unique first identifier 310, as well as other pertinent card information. Such other information can include secondary identifiers, deck placement, shoe placement, and/or current or last known location of the card, such as at a particular gaming table or off the gaming floor in casino storage, for example.

One or more separate second identifiers 321, 322, 323 can also be present on the face of the playing card 300. Such second identifiers can be, for example, the actual rank 321 and suit 322 of the playing card itself. Alternatively, or in addition, one or more further secondary identifiers 323 can also be present. As shown, a separate QR code 323 can also be included along an edge or border of the face of the playing card. Such another separate second identifier 323 can also include data regarding the rank and/or suit of the card 300, albeit in a format that is more readily machine readable or detectable. For example, QR code 323 simply reads "seven of hearts," which can be detected quickly by a system sensor or scanner. While the separate second identifiers 321, 322, 323 may be readily predictable and easy to duplicate, it is specifically contemplated that it will be difficult or impossible to predict and duplicate the unique coded information in each first identifier 310.

Figure 4A:
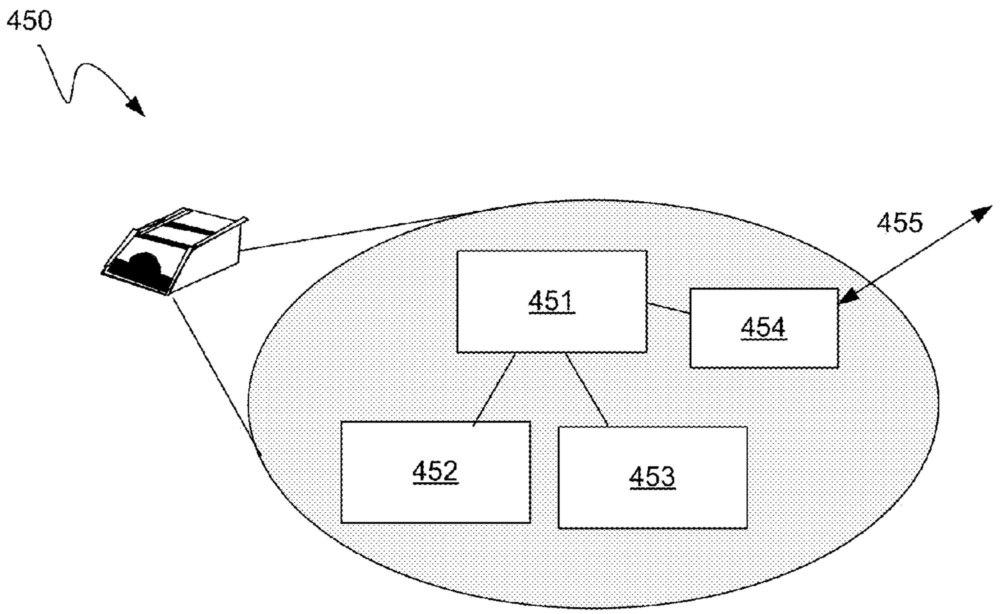
FIG. 4A illustrates in block diagram format an exemplary electronic card shoe for use with a gaming card verification system according to one embodiment of the present disclosure.
Figure 4B:
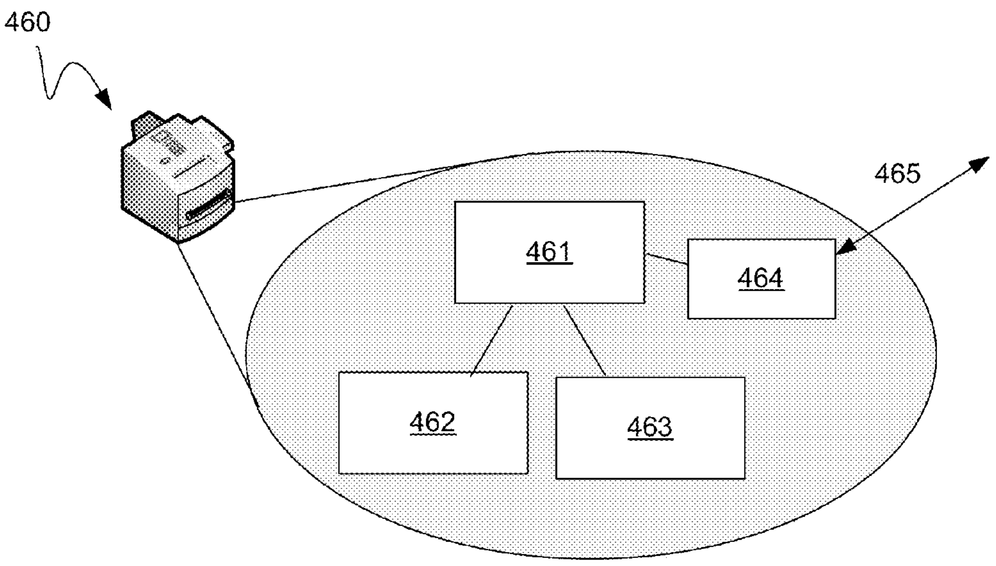
FIG. 4B illustrates in block diagram format an exemplary electronic discard rack for use with a gaming card verification system according to one embodiment of the present disclosure.

FIG. 4A illustrates in block diagram format an exemplary electronic card shoe for use with a gaming card verification system, while FIG. 4B similarly illustrates in block diagram format an exemplary electronic discard rack for use with the gaming card verification system. Unlike conventional electronic card shoes, specialized card shoe 450 can include multiple sensors adapted to detect different indicia, identifiers or codes on each playing card. A playing card detected or read by electronic card handler or shoe 450 can be verified when both of its first identifier and second identifier(s) are detected and read by the smart shoe or other suitable automated card handling device.

Electronic card handler or shoe 450 can include, for example, a local processor 451 that is coupled to a first sensor 452, a second sensor 453, and a communication interface 454. The interface 454 can include an external link 455 that couples the smart card shoe 450 to a table controller and/or other external system device or processor. The first sensor 452 can be adapted to read a first identifier 310 on a given playing card 300, such as when the card is dealt from the shoe. Similarly, the second sensor 453 can be adapted to read one or more of the separate second identifiers 321, 322, 323 located on the card 300. Again, such detection or reading can take place automatically as the card is dealt from the shoe.

The detection or readings of the first and second identifiers can then be used to verify or authenticate the card in real time as it is being used for game play. The first and second identifiers sensed by sensors 452 and 453 can be communicated to the shoe controller 451 and/or the table controller via link 455. An appropriate comparison of values can then be made at the appropriate controller, whether it be the shoe controller or the table controller. In some embodiments, comparisons of detected identifiers and known stored data could even be made at a system controller or server remotely. In any event, where the detected or read values for the first and/or second identifiers check out properly, then no action is taken.

Where an error or unexpected reading occurs and does not verify against the known data, however, then an alert or alarm can be provided. Such an unexpected reading can take place due to an unexpected or counterfeit card being at the table, for example. An alert can then be provided to the dealer, who would have the ability to stop play in order to reconcile the problem. Other error situations or unexpected conditions could also result from an expected card never appearing or being detected by the shoe, for example.

Similar to the smart shoe, the electronic discard rack 460 can include a local processor 461 that is coupled to a third sensor 462, a fourth sensor 463, and a communication interface 464. The interface 464 can similarly include an external link 465 that couples the smart discard rack 460 to a table controller and/or other external system device or processor. Similar to the smart shoe, the third sensor 462 can be adapted to read a first identifier 310 on a given playing card 300, such as when the card is collected into the rack. Similarly, the fourth sensor 463 can be adapted to read one or more of the separate second identifiers 321, 322, 323 located on the card 300. Again, such detection or reading can take place automatically as the card is used up from game play and placed into the discard rack.

The detected identifiers from cards in the discard rack can then be used to identify cards that were presumably just in play at the gaming table. As such, the detected values can be compared with values that have been recently detected by the electronic card handler or shoe 450. That is, no playing card should appear in the smart discard rack 460 unless it has been recently dealt from the eShoe 450. If any card is detected in the discard rack that has not been recently dealt from the shoe, then an error message or alert can be provided. In addition, all cards dealt from the smart shoe should eventually find their way into the discard rack in some embodiments. As such, the system can be set up to provide an error message or alert in the event that a specific amount of time has elapsed from the time that a card is dealt from the smart shoe without that card then showing up in the discard rack. Such a time can be, for example, five or ten minutes, although other times are also possible. Alternatively, a set amount of time can be foregone in lieu of a designated finish of a hand or game. That is, all cards that were dealt from the eShoe for a given hand or game must arrive at the discard rack before the eShoe will allow more cards to be dealt for the next hand or game, for example.

A hybrid variation of the disclosed system can include both of the "first" and "second" card identifiers or codes (i.e., unique card ID, and card value) being combined and printed on the card. That is, when the decks or playing cards are being manufactured or are later labeled or tagged with the identifiers of interest, the unique ID for each card can be generated by combining the value of the card to a separate random number—which results in a random ID number that also indicates the suit and/or rank of the card all in one code. This unique code can be printed or otherwise placed on the card, which again can be done with visible ink, invisible ink, UV coating, bar code, RFID items, or the like. In operation, the first sensor can reads this ID, decode the value of the card, and compare this reading to the actual value read by the second sensor to see if there is a match.

In various embodiments, the specific card data, such as first identifiers, second identifiers, locations and the like, can be stored on a system database or other suitable component. This information can then be communicated as may be appropriate to a given gaming table upon the arrival at that table of a batch or other subset of gaming cards, such that further detection and tracking can be done and compared locally at the table. This local detection and tracking can be done by the local table controller, within the smart shoe and/or smart discard rack, or any combination thereof. So as not to overburden a potentially limited storage on the local table controller or other devices, only data regarding cards that should be at the gaming table need be stored temporarily at the table for detection and tracking.

For example, where six new decks of playing cards are to arrive at a given gaming table, information regarding all of the cards in those six decks can be provided from the central database to the local table controller at the table. The local controller can then store this data particular to the cards that are then at the table on a storage component that is local to the table controller. In some embodiments, this can involve only data regarding cards that should be at the gaming table being stored locally at the table. When one or more of those six decks of cards are then removed from the gaming table, an instruction can be given to delete the data with respect to those departing cards from the local data storage at the table. In this manner, the reading and comparing of indicators can all take place locally during routine game play, such that ongoing and continuous communications with remote servers or storage components is not necessary in order to verify cards in real time.

Figure 5:
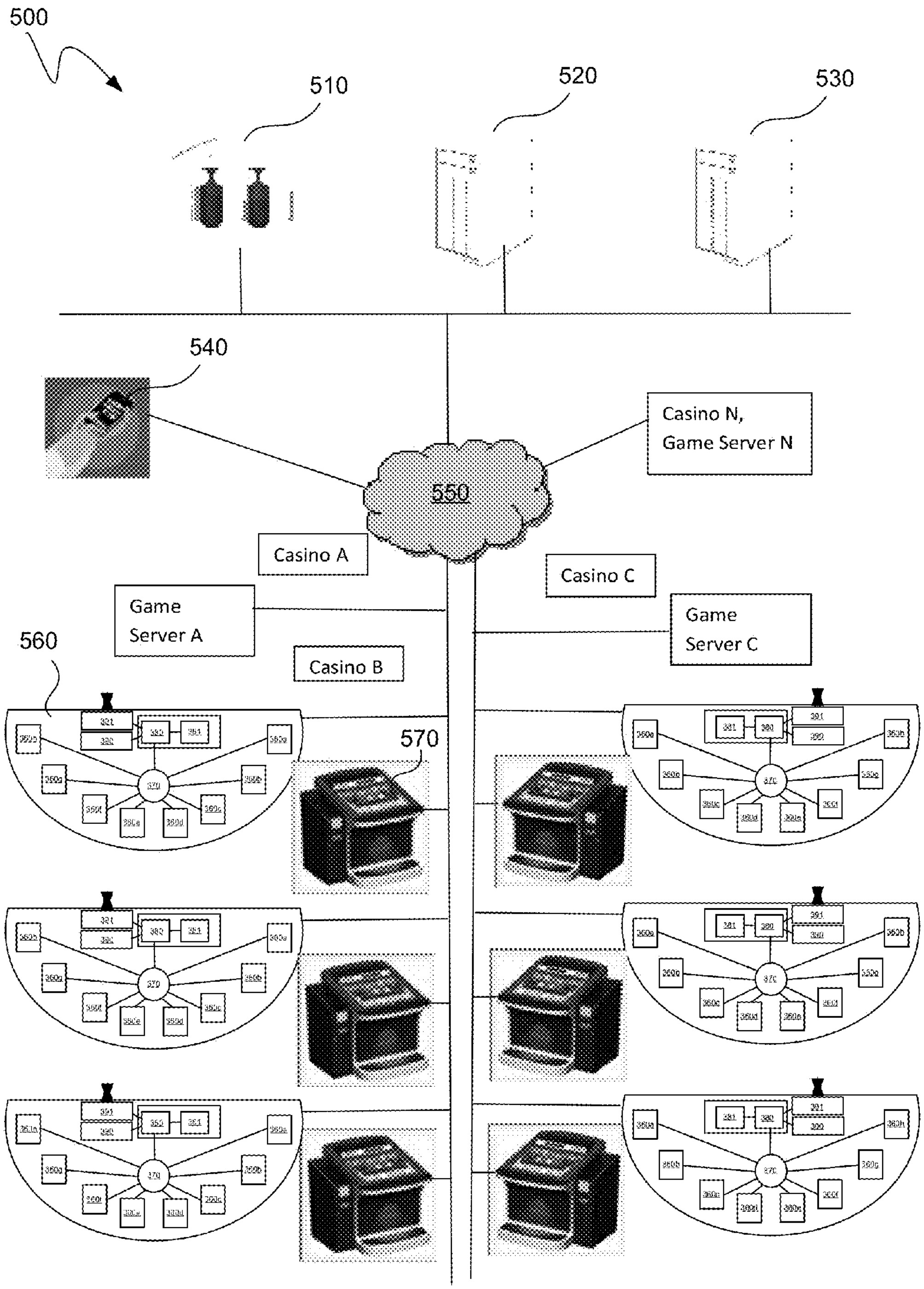
FIG. 5 illustrates in block diagram format an exemplary wide area electronic gaming system utilizing multiple player terminals, multiple electronic tables and various other system components across multiple locations according to one embodiment of the present disclosure.

Transitioning to FIG. 5, an exemplary electronic gaming system utilizing multiple electronic tables, a remote system server, a database, and various other system components across multiple locations is illustrated in block diagram format. Wide area system 500 can include a wide variety of components and items, such as a bank 510, a games router 520, and a financial clearinghouse 530. A cloud 550 or network can couple these items to various eTables, terminals, game servers, casinos, and other distributed components. One or more personal devices 540 can serve as remote player terminals in some embodiments. Various networked casinos, game servers, eTables 560 and other remote terminals 570 can also be coupled through the cloud 450 or network in wide area system 500.

One or more game servers may be present in wide area system 500, and each operates in a particular manner to facilitate the play of the various table games set forth above. In such embodiments, a game server can collect live game information from each eTable, apply game rules, and return game results. Besides monitoring and controlling the games, the game server can also keep track, in a database, the presence and identifying information for various system playing cards or other game elements, as well as the game history of each eTable, accounting information, revenue reports, maintenance information, and the like. Each of these individual functions can be performed by a separate application on a separate server, or integrated into one application running on one comprehensive server. The determination of one or multiple servers and applications depends on the number of eTables, game stations, remote gaming terminals, both local and remote, that are being connected across the system. For example, a specialized system server or processor can be dedicated to tracking playing card IDs and locations.

Further functions of the system servers can include game resolution at various tables, the handling of financial transactions from remote game terminals, the push of live game information to the game server to be broadcast to remote gaming terminals, matchmaking between player terminals and gaming tables, providing communications between tables and other system components, and other pertinent gaming system functions. Details regarding these and other table gaming system functions can be found at, for example, previously incorporated U.S. patent application Ser. Nos. 14/017,073; 14/017,071; 13/948,101; 13/893,340; and Ser. No. 13/844,617, among other locations.

Figure 6:
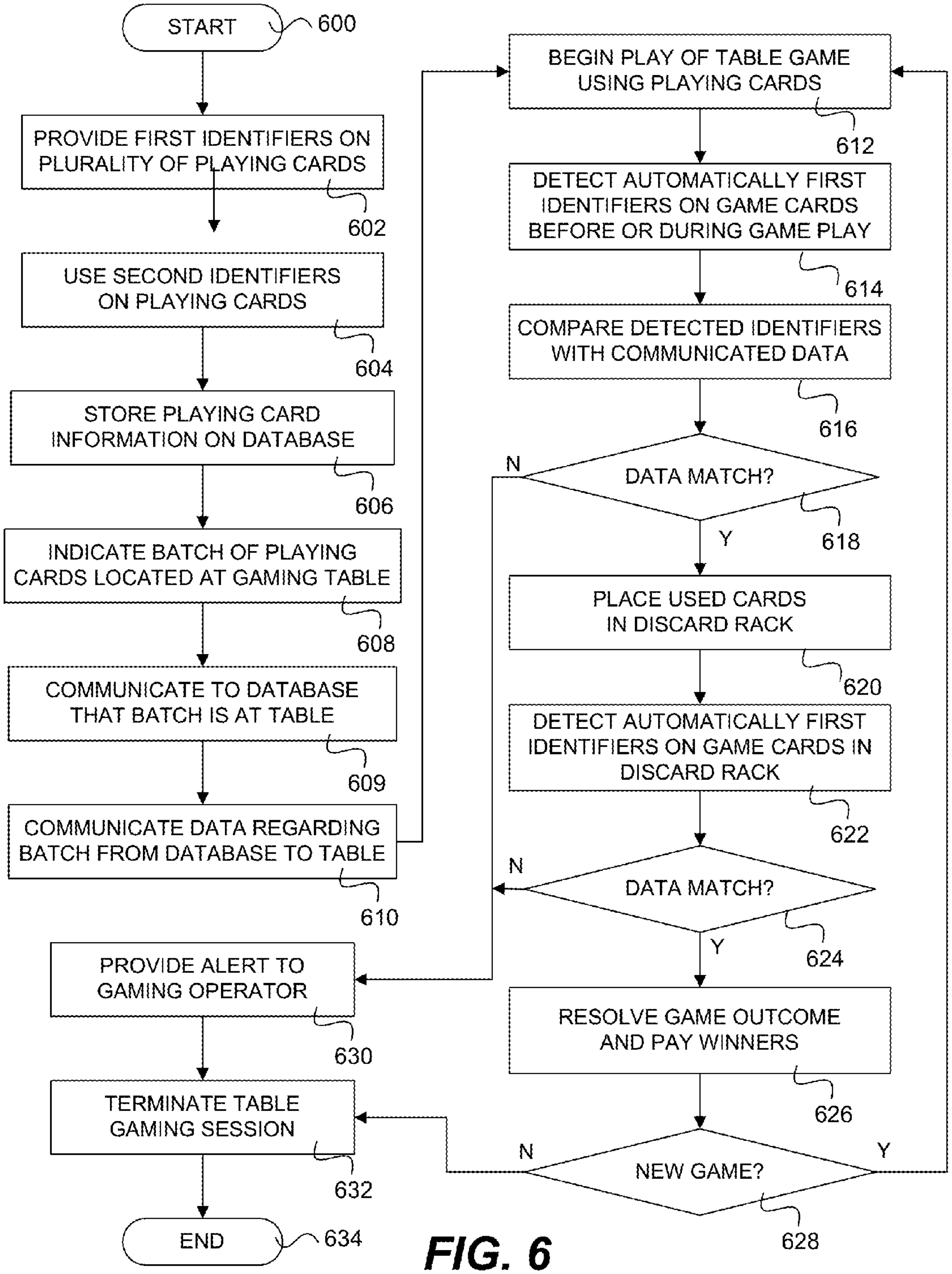
FIG. 6 provides a flowchart of an exemplary method of tracking playing cards within a gaming system according to one embodiment of the present disclosure.

Moving lastly to FIG. 6, a flowchart of an exemplary method of tracking playing cards within a gaming system is provided. After a start step 600, suitable initial or first identifiers are provided on each of a plurality of playing cards at a process step 602. As noted above, such identifiers can be provided at the time of the card manufacture, or at some later time, such as by way of added ink, sticker, imprint or the like. These initial identifiers can be unique for each separate card, and can be randomly generated, such that predictability is minimized. At a following process step 604, second identifiers or indicia on one or more of the playing cards are used. Again, such second identifiers can be or can indicate the actual card rank, suit, or other value, such as for use in game play.

At a process step 606, various data items and other information for the playing cards can be stored on a database or other storage component. Such card information can include the first identifiers, the second identifiers, the current or last noted location of the cards, and so forth. A subsequent process step 608 can involve indicating when a batch of playing cards arrives at or is otherwise located at a given electronic gaming table. Such a batch of playing cards can be, for example, one or more given decks of cards. Upon indication that the batch or other subset of playing cards is at a given gaming table, data regarding the batch of cards can be communicated from the database or other storage component to the relevant gaming table at process step 610.

At the next process step 612, the play of at least one hand or other table game using the playing cards can begin. Before or during the game play, one or more first identifiers can be detected on one or more game cards at process step 614. The detected identifiers from actual physical cards in play can then be compared or verified against the communicated data from the database at process step 616, such that the cards in play can be authenticated.

At a following decision step 618, an inquiry is made as to whether the detected identifiers or other data matches with that which is expected for playing cards that should be at the gaming table. If not, then the method diverts to process step 630, where an alert or other alarm or notice is provided to the gaming operator, and the table gaming session is terminated at process step 632. If the data matches as expected, however, then the method continues to process step 620, where used playing cards are placed in a discard rack.

Cards in the discard rack can then again have their first identifiers read or detected at process step 622, after which a similar inquiry can be made at decision step 624. Again, if the detected or sense identifiers or other card data matches with that which is known in the system, then the method can continue to process step 626. If there is no data match, however, then the method similarly diverts to process steps 630 and 632, after which the method ends at end step 634.

When the card data matches as would be expected at decision step 624, then the game can be resolved and game winners are paid at process step 626. An inquiry can then be made at decision step 628 as to whether more table games involving the playing cards are to be played. If so, then the method reverts back to process step 612, and steps 612 through 628 are repeated. If no further games are to be played, however, then the method continues to process step 632, whereupon the table gaming session is terminated. The method then ends at end step 634.

For the foregoing flowchart, it will be readily appreciated that not every method step provided is always necessary, and that further steps not set forth herein may also be included. For example, added steps to involve further data on playing cards or game play conducting and payouts may be added. Furthermore, the exact order of steps may be altered as desired, and some steps may be performed simultaneously. For example, step 606 may be performed before or after step 604 in various embodiments. In addition, while the provided examples are with respect to card games, it will be readily understood that other casino and wagering games can be similarly adapted to provide similar game component tracking, such as for dice, chips, balls, markers, tokens and the like.

It should be understood that the devices, systems and methods described herein may be adapted and configured to function independently or may also interact with other systems or applications, such as for example, a casino management system or player tracking system. As such, playing card identifying or tracking data may be recorded and stored in connection with casino or resort management data, player information, or other data retrieved from a table, terminal or other pertinent location. It should also be readily apparent that additional computerized or manual systems may also be employed in accordance with the disclosure in order to achieve its full implementation as a system, apparatus or method.

Those skilled in the art will readily appreciate that any of the systems and methods of the disclosure may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as an existing electronic gaming machine, portable computing device or electronic platforms with multiple player positions. In addition, the system of the disclosure may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the disclosure so long as players and operators thereof are provided with useful access thereto or the opportunity to play the game as described herein.

The various aspects, embodiments, implementations or features of the described embodiments can be used separately or in any combination. Various aspects of the described embodiments can be implemented by software, hardware or a combination of hardware and software. Computer readable medium can be any data storage device that can store data which can thereafter be read by a computer system. Examples of computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

The invention claimed is:

1. An electronic gaming table adapted to host table games involving wagers, game play based on the wagers, and monetary awards based on the results of the game play, the electronic gaming table comprising:

a physical surface adapted for the play of live table games that include the use of a plurality of playing cards;

a single automated card handling device adapted to handle and detect the plurality of playing cards, wherein said single automated card handling device includes both of a first sensor adapted to sense a first identifier on a playing card and a separate second sensor adapted to sense a separate second identifier on the same playing card at or about the same time that the first identifier is sensed, wherein the first identifier indicates whether the playing card belongs at the electronic gaming table, and wherein the separate second identifier indicates a game value of the playing card; and a table controller coupled to said automated card handling device and adapted to control a plurality of electronic gaming table functions, wherein said table controller is adapted to facilitate a comparison of the results detected by the first and second sensors, and wherein said table controller is further adapted to facilitate the provision of an alert when an improper first identifier on a playing card is detected.

2. The electronic gaming table of claim 1, wherein said table controller is further adapted to utilize the detected game value of a second identifier while controlling one or the plurality of electronic gaming table functions.

3. The electronic gaming table of claim 2, wherein the first identifier includes an identification code and the second identifier includes the suit of the playing card, the rank of the playing card, or both.

4. The electronic gaming table of claim 3, wherein the first identifier indicates whether the playing card belongs to a deck of playing cards that is known to belong at the electronic gaming table.

5. The electronic gaming table of claim 1, wherein said automated card handling device is an electronic card shoe.

6. The electronic gaming table of claim 1, wherein one or both of the first and second identifiers includes a bar code.

7. The electronic gaming table of claim 1, wherein one or both of the first and second identifiers is printed with invisible ink.

8. The electronic gaming table of claim 1, wherein the first identifier is unique to its respective playing card.

9. The electronic gaming table of claim 8, wherein the first identifier is a randomly generated and assigned number or code.

10. The electronic gaming table of claim 1, wherein the comparison includes verifying whether the sensed second identifier is appropriate for the sensed first identifier.

11. The electronic gaming table of claim 1, further comprising:

an automated collection component in communication with the table controller and adapted to contain playing cards that are discarded or used during or after the live table games, wherein said automated collection component includes a third sensor adapted to sense the first identifier, the second identifier, or both.

12. The electronic gaming table of claim 1, further comprising:

a communications interface adapted to couple the table controller with one or more external system components, wherein the one or more external system components include additional electronic gaming tables, a remote server, a database or other storage including playing card information, or any combination thereof.

13. The electronic gaming table of claim 12, wherein said table controller is further adapted to communicate with said one or more external system components in order to facilitate the reconciliation of playing card detection by an overall system that includes said electronic gaming table.

14. A gaming card verification system, comprising:

one or more electronic gaming tables adapted to host table games involving wagers, game play based on the wagers, and monetary awards based on the results of the game play, wherein each of said one or more electronic gaming tables includes a physical surface adapted for the play of live table games that include the use of a plurality of playing cards, a single automated card handling device adapted to handle and detect the plurality of playing cards, wherein said single automated card handling device includes both of a first sensor adapted to sense a first identifier on a playing card and a separate second sensor adapted to sense a separate second identifier on the same playing card at or about the same time that the first identifier is sensed, wherein the first identifier indicates whether the playing card belongs at the electronic gaming table, and wherein the separate second identifier indicates a game value of the playing card, and a table controller coupled to said automated card handling device and adapted to control a plurality of electronic gaming table functions, wherein said table controller is adapted to facilitate a comparison of the results detected by the first and second sensors, and wherein said table controller is further adapted to facilitate the provision of an alert when an improper first identifier on a playing card is detected; and a system server in communication with and located remotely from said one or more electronic gaming tables, wherein said system server is adapted to track the presence and location of playing cards at each of the one or more electronic gaming tables and facilitate the provision of an alert when an improper condition with respect to any playing card at any table is detected.

15. The gaming card verification system of claim 14, wherein the first identifier is a randomly generated and assigned number or code that is unique to its respective playing card.

16. The gaming card verification system of claim 14, further comprising:

a storage component in communication with said system server, wherein said storage component contains information regarding a plurality of playing cards located at said one or more electronic gaming tables.

17. The gaming card verification system of claim 16, wherein said system server is further adapted to provide information from said storage component to an individual table controller at a first of said one or more electronic gaming tables, wherein the information provided is with respect to playing cards that should be at the first electronic gaming table, and wherein the table controller at the first electronic gaming table is adapted to track cards locally at the table using the provided information without requiring further communication with said system server.

18. The gaming card verification system of claim 16, wherein the first identifier on each playing card is a randomly generated and assigned code that is unique to its respective playing card, and wherein this code is stored on said storage component for substantially all playing cards in the system.

19. A method of tracking playing cards within a gaming system, the method comprising:

providing a first identifier on each of a plurality of playing cards, wherein each first identifier is unique with respect to every other first identifier;

using a separate second identifier on each of the plurality of playing cards, wherein the separate second identifier indicates a game value of the playing card;

storing information regarding each of said plurality of playing cards on a system storage component, wherein the stored information includes at least the first identifier and the second identifier for each playing card;

indicating when a batch of playing cards is provided at a gaming table within the gaming system, wherein the batch of playing cards is all or a subset of the overall plurality of playing cards;

communicating information regarding the batch of playing cards from the system storage component to a table controller at the gaming table where the batch of playing cards is located;

detecting automatically and at or about the same time both of the first identifier and second identifier of one or more playing cards used for a table game at the gaming table;

comparing the detected identifiers with the information communicated to the table controller, wherein said comparing includes verifying whether the second identifier is appropriate for the first identifier detected on one or more playing cards; and giving an alert when a detected identifier is not verifiable with the information communicated to the table controller.

20. The method of claim 19, wherein the system storage component is located remotely from the gaming table.

21. The method of claim 19, wherein said providing a first identifier includes generating a random code as part or all of each first identifier.

22. The method of claim 19, wherein the stored information for each playing card further includes an identifier for a playing card deck or electronic card shoe to which the playing card belongs.

23. The method of claim 19, further including the steps of:

placing the one or more used playing cards into an automated collection component at the gaming table;

re-detecting automatically at the automated collection component the first identifier and second identifier of the one or more used playing cards; and giving an alert when a detected identifier is not one that was already detected automatically for game play, or when an identifier detected for game play is not detected at the automated collection component within a defined time period.

24. The electronic gaming table of claim 10, wherein the verifying includes comparing the sensed first and second identifiers against previously stored matchings of first and second identifiers for the plurality of playing cards.

25. The electronic gaming table of claim 10, wherein the previously stored matchings of first and second identifiers for the plurality of playing cards are stored prior to any sensing of the first identifier or second identifier at the electronic gaming table.

* * * * *